United States Patent Office 3,477,874
Patented Nov. 11, 1969

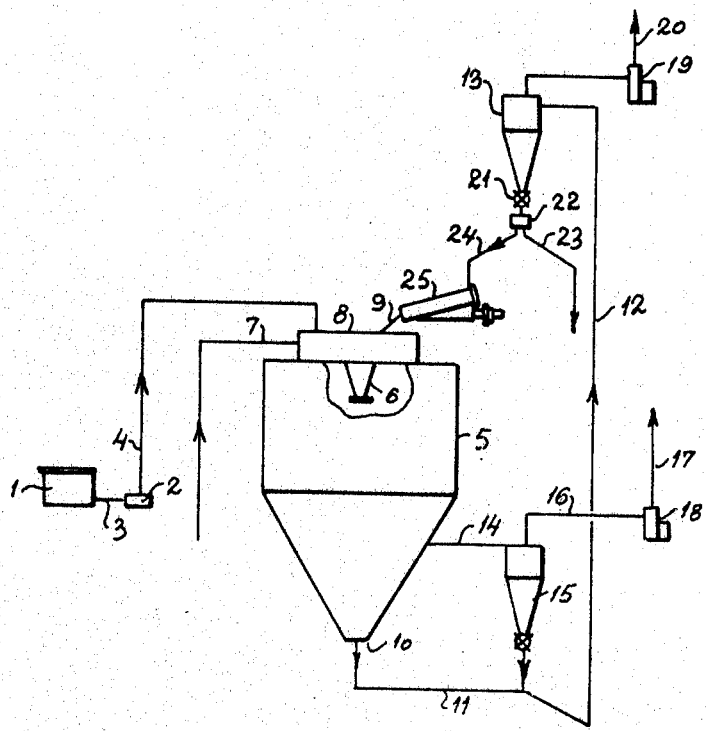

3,477,874
PROCESS FOR PREPARING A DRY FREE-FLOWING GLUCOSE PRODUCT FROM A SOLUTION THEREOF
Inger Repsdorph, Hellerup, Karl Kristian Kobs Kroyer, Viby, and Jorgen Damgard-Iversen, Birkerod, Denmark, assignors to Karl Kristian Kobs Kroyer, Viby, and Aktieselskabet Niro Atomizer, Soborg, Denmark
Filed Apr. 15, 1965, Ser. No. 448,352
Claims priority, application Denmark, Apr. 17, 1964, 1,913/64
Int. Cl. C13k 1/00, 1/10
U.S. Cl. 127—58                5 Claims

ABSTRACT OF THE DISCLOSURE

A process and apparatus for preparing a dry free-flowing glucose product of high DE-value from a solution wherein the solution is first subjected to spray drying to form solidified particles, subjecting the solidified particles to a flow of dry air, and thereafter recycling a portion of the dried solidified particles to the spray drying apparatus at a rate higher than the rate at which the solution is supplied to the same apparatus, the rate being calculated on the basis of dried glucose.

---

This invention relates to a process for preparing a dry free-flowing glucose product from a solution thereof formed by the conversion of starch.

It is well known that by hydrolysing starch with the aid of an acid, a solution may be produced which by suitably selecting the hydrolyzing conditions will predominantly contain glucose.

The preparation of the conversion products from this solution has in practice hitherto been performed by one or the other of two well known methods. According to one of these, the solution, after having been subjected to neutralization, decoloring, filtering and ion exchange, if desired, is concentrated by evaporation until a concentrate having a dry matter content of 80 to 84% is obtained. Thereafter the concentrate is cooled, crystallization seeds are added, and the mass is poured into molds in which a progressive solidification of the mass will then take place. After the mass has become sufficiently hard, which may take several days, it is withdrawn from the molds and is subdivided into lumps. The glucose product thus formed is then ground to a powder and dried. This known method is difficult to carry out in practice, one reason for this being that the product which has a low melting point will tend to become sticky during the grinding owing to the heat developed in this operation. Moreover, the powder has the drawback of having a bitter taste.

Since this bitter taste results from certain impurities in the glucose product, it has hitherto been considered necessary, when desiring a glucose product without an aftertaste to use the other one of the two known methods. According to this method, the thin juice formed by the acid hydrolysis, after having been subjected to decoloring, filtration and demineralization, if desired, is concentrated by evaporation until obtaining a dry matter content of 70 to 80% and is then supplied to a crystallization apparatus with stirring device, in which apparatus crystallization germs are added to the juice. After three or more days, the crystals are separated from the mother liquor e.g. by centrifugation and the mother liquor is subjected to renewed evaporation and purification if desired, whereafter it is again subjected to crystallization.

By the separation of the mother liquor from the crystals, practically all undesired substances are removed and a glucose product is therefore obtained, which is very satisfactory as regards taste. However, as will be understood, this takes place at the expense of an extremely prolonged and expensive process.

It is also known that a hydrolysis of starch may be performed with the aid of enzymes, and that it is thereby possible to obtain a product of a considerably higher purity than in the case of acid hydrolysis. The purity of the conversion product is expressed in dextrose equivalents DE whereby is understood the percentage of reducing carbohydrates calculated on the basis of dry matter.

In the acid hydrolysis, the process is usually interrupted when a DE value of 90 to 92 is obtained, whereas the enzymatic hydrolysis is usually continued until a DE value of at least 95 has been obtained.

In connection with the obtaining of such high degrees of purity it has been found that the content of the taste affecting substances is reduced, and it has therefore been proposed to prepare a glucose product without an aftertaste by subjecting an enzyme hydrolysate having a DE-value of at least 92 until obtaining a dry matter content of 69 to 80% by weight, and then leaving the concentrate to solidify in molds under such conditions that an expansion may take place without obstruction. This is usually performed in special molds with cooling, but without stirring. The product thus formed in which the remaining mother liquor is still present is semi-crystalline and may ordinarily be removed from molds after about 20 hours and may then be pulverized. The product is thereafter additionally dried to remove practically all non-bound water.

It will be realized that this discontinuous process is also very time-consuming and the production costs are relatively high.

A common feature of the discontinuous processes referred to is that the evaporation is interrupted at some time before the desired dryness has been obtained, and the partially evaporated product is then left to crystallization or solidification in suitable vessels, whereafter the mass thus formed is subjected to grinding.

It is the object of the invention to devise a simple and fast process for continuously preparing a dry free-flowing glucose product from a solution thereof.

It has now surprisingly been found that the preparation of a dry free-flowing glucose product of high DE-value may not only be performed continuously but even instantaneously by a substantially complete evaporation, so as to obtain a free-flowing product of high DE-value and of a desired dry matter content.

To achieve this, the process according to the invention comprises the steps of supplying said solution to a special spray drying apparatus, withdrawing from said spray drying apparatus the solidified particles formed therein, subjecting said solidified particles to a flow of drying and cooling air, and thereafter recycling a portion said solidified particles to said spray drying apparatus at a rate higher than the rate of supply of said solution calculated as dry matter.

It is observed that the spray drying of so-called glucose sirup, i.e. a glucose product having a DE-value of 30-40 is well-known and can be performed without any difficulties and entirely without recycling.

Moreover, it is well-known in the spray drying art in general to recycle the fines fraction of the spray dried product in order to agglomerate these fine particles with the coarser particles so as to obtain a less dusty product.

However, both of these known processes have proved to fail if an attempt is made at applying them to a glucose solution of high DE-value because the product formed in the spray drying apparatus will be so sticky as to clog the apparatus in a very short time.

By a glucose product of high DE-value is to be understood a product having a DE-value higher than 70 and preferably about 90 and even higher.

The spray drying of a glucose product of such a high DE-value has been made possible according to the invention by proceeding in the manner above specified which differs from the known spraying art mainly in the following respects:

(1) The amount of recycled product should be substantially higher than the amount of fresh solution supplied to the spray drying apparatus, calculated as dry matter, or in other words, more than 50% of the product leaving the spray drying apparatus should be recycled which is a proportion by far greater than the fraction of finest particles which in accordance with prior art has sometimes been recycled for agglomeration purposes in the spray drying of various products, not including glucose of high DE-value. In fact, the amount of recycled product may advantageously by chosen as high as up to six times the amount of fresh product supplied to the spray drying apparatus.

(2) The spray dried product should be subjected to a flow of dry air before being recycled. The effect of this step is not just to reduce the water content of the product still further—in fact this reduction is relatively small—but it has been found that by this step of subjecting the particles to the flow of dry air even for a space of a few seconds, the product will undergo a structural re-arrangement and crystallization to some extent, whereby the product is conditioned so as still further to reduce the tackiness of the product.

At any rate, whatever the theoretical explanation may be, it has been found in practice that by proceeding in the manner indicated, a product will be formed which is non-sticky and does not clog the spray drying apparatus so that the spray drying process may be carried out without difficulty. Besides, it has been found that the product thus formed will be relatively porous and will therefore be very suitable for many purposes where it is desirable to dissolve the glucose powder in a minimum of time.

One mode of carrying out the invention will now be described with reference to the accompanying drawing, which shows a flow diagram of an apparatus for carrying out the process.

In the drawing, 1 is a vessel containing an aqueous solution of glucose of high DE-value having a dry matter content of about 75%. A pump 2 serves to supply the glucose solution through pipes 3 and 4 to an atomizer 6 mounted in a spray drying chamber 5. The atomizer may e.g. in known manner consist of an atomizing wheel rotating at high speed. By means of the atomizer 6, the solution is split up into fine particles forming a mist in the spray drying chamber. Hot air is at the same time supplied through a pipe 7 to an air distributor 8 in a quantity and at a temperature such that an evaporation of the aqueous solvent will take place before the mist particles strike the conical bottom of the spray drying chamber.

At the same time, a solid, non-sticky recycled glucose product is supplied to the spray drying chamber 5 through a separate pipe 9 and is in known manner atomized in the chamber.

The recycled glucose product is supplied in an amount substantially exceeding the amount of dry matter in the fresh solution supplied to the spray drying apparatus, and it has been found that by proceeding in this manner, the glucose particles formed by dehydration of the fresh liquid will be powdered by the recycled product in such a manner as to loose the stickiness which they would otherwise possess and which would result in clogging of the spray drying apparatus in a minimum of time. The recycled product also promotes crystallization of the fresh particles during drying in the spray drying apparatus which further contributes towards preventing stickiness. As a result of these combined influences, a solid free-flowing glucose product may be taken out through an outlet 10 at the bottom of the spray drying chamber. This product is supplied to a conveying member 11 and is then pneumatically conveyed through a pipe 12 to a cyclone 13, while at the same time being subjected to the influence of the dry air by means of which the pneumatic conveying is performed. Thereby the product is further dried, and at the same time is conditioned as previously explained by being maintained in a dry and cool atmosphere. Preferably, the air used for the pneumatic conveying, the drying and the conditioning of the product is supplied at a relatively low temperature such as 30° C. so as also to cool the product.

The drying air used in the spray drying chamber 5 is conducted through a pipe 14 to a cyclone 15 in which the powder carried along by the air is separated from the latter and is discharged from the bottom of the cyclone to the conveying member 11, while the air is removed from the cyclone 15 through a passage 16 and a blow off-pipe 17 by means of a blower 18.

In the cyclone 13, the glucose product is separated from the conveying air and collects in the lower portion of the cyclone while the conveying air is removed by means of a blower 19 and discharged through a pipe 20.

At the bottom of the cyclone 13 there is arranged a sluice 21 and below the latter a fractioning device 22 is provided, which may e.g. separate the product into a minor fraction of relatively coarse particles, which are passed through a pipe 23 through a storing or packing station, and a major fraction of relatively finer particles which are passed through a pipe 24 to a vibrator 25 from which the pulverulent product is passed to the spray drying chamber 5 through the pipe 9 as previously mentioned. The proportion of the product passed through the pipe 24 should at any rate be greater than the proportion passed through the pipe 23, and preferably the relative proportions should be selected at a predetermined value and while this distribution may be accompanied by a certain fractioning according to size as above mentioned, this is not essential. If desired, the product recycled to the spray drying apparatus may be comminuted before entering the latter.

If the conveying member 11 is in the form of a pipe having an air intake at one end thereof, and connected to the bottom outlets of the spray drying chamber 5 and the cyclone 15 through branch pipes, preferably through a sluice, as far as the cyclone 15 is concerned, said pipe being connected to the pipe 12 at the other end thereof, the whole conveying of the spray dried product may be performed pneumatically in a closed system, either by means of the blower 19 alone, or additionally by means of a blower provided at the junction between the pipes 11 and 12 and serving at the same time to subject the product to a certain desintegrating effect so as to break up any lumps. In that case, the vacuum in the spray drying chamber and in the pipe 11 should be relatively adjusted in such a manner as to permit the transfer of spray dried particles from the bottom ends of the spray drying chamber 5 and the cyclone 15 to the pipe 11.

We claim:

1. A process for preparing a dry free-flowing glucose product of high DE-value from a solution thereof comprising the steps of supplying said solution to a spray drying apparatus, withdrawing from said spray drying apparatus the solidified particles formed therein, subjecting said solidified particles to a flow of drying and cooling air, and thereafter recycling a portion of said solidified particles to said spray drying apparatus at a rate higher than the rate of supply of said solution calculated as dry matter.

2. A process as claimed in claim 1 wherein said glucose product has a DE-value greater than 70.

3. A process as claimed in claim 1 wherein said glucose product has a DE-value of about 90.

4. A process as claimed in claim 1 wherein said solidified particles are recycled to said spray drying apparatus at a rate ranging between more than 50 percent to as high as up to six times the rate of supply of said solution calculated as dry matter.

5. A process as claimed in claim 1 wherein said solidified particles formed in said spray drying apparatus are conveyed pneumatically while being subjected to a flow of dry air.

References Cited

UNITED STATES PATENTS

| 1,301,288 | 4/1919 | MacLachian | 127—16 X |
| 1,670,101 | 5/1928 | Dickerson | 127—61 |
| 1,983,434 | 12/1934 | Black et al. | 127—61 X |
| 2,317,479 | 4/1943 | Peebles et al. | 127—30 |
| 2,627,463 | 2/1953 | Meade | 127—31 |
| 2,954,306 | 9/1960 | Bond et al. | 127—58 |
| 3,112,239 | 11/1963 | Andermatt. | |
| 3,331,306 | 7/1967 | Hutton et al. | 99—56 X |

MORRIS O. WOLK, Primary Examiner

D. G. CONLIN, Assistant Examiner

U.S. Cl. X.R.

34—10; 99—203; 127—63, 61